(12) United States Patent
Han et al.

(10) Patent No.: US 6,281,658 B1
(45) Date of Patent: Aug. 28, 2001

(54) POWER FACTOR COMPENSATION DEVICE FOR MOTOR DRIVING INVERTER SYSTEM

(75) Inventors: Gyeong-Hae Han, Kwangmyung; Jong-Ho Kim, Koyang; Keon Sim, Seoul; Hyung-Sang Lee, Sungnam; Dong-Hyuk Lee, Inchon, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/475,189

(22) Filed: Dec. 30, 1999

(30) Foreign Application Priority Data

| Jan. 8, 1999 | (KR) | 99-281 |
| Jul. 20, 1999 | (KR) | 99-29287 |
| Jul. 20, 1999 | (KR) | 99-29293 |
| Jul. 20, 1999 | (KR) | 99-29296 |

(51) Int. Cl.$^7$ ...................................................... H02P 7/42
(52) U.S. Cl. ........................................... 318/729; 318/801
(58) Field of Search .................... 318/729, 801; 363/37, 40, 98

(56) References Cited

U.S. PATENT DOCUMENTS

| 4,413,217 | * | 11/1983 | Creen et al. ........................ 318/729 |
| 4,469,997 | * | 9/1984 | Curtiss et al. ....................... 318/729 |
| 4,935,684 | * | 6/1990 | Watanabe ............................. 318/729 |
| 5,359,154 | * | 10/1994 | Tsukasa et al. ...................... 177/145 |
| 5,739,650 | * | 4/1998 | Kimura et al. ....................... 318/254 |
| 5,793,623 | * | 8/1998 | Kawashima et al. ................. 363/56 |

* cited by examiner

*Primary Examiner*—Bentsu Ro
*Assistant Examiner*—Rita Leykin
(74) *Attorney, Agent, or Firm*—Fleshner & Kim, LLP

(57) ABSTRACT

The present invention relates to a power factor compensation device for a motor driving inverter which can improve a power factor of a voltage and a current inputted to the inverter driving a motor. The present invention detects a zero crossing point of an utility alternating current power, and outputs a driving signal corresponding to a plurality of sine wave form voltage values stored in a memory according to a detection result, when the zero crossing point of the utility alternating current power is detected in a state where the plurality of sine wave form voltage values corresponding to a voltage of the utility alternating current power and frequencies are stored in the memory. A switching transistor is switched according to the driving signal, and the voltage applied to the inverter is switched according to the switching operation, thereby improving the power factor.

29 Claims, 10 Drawing Sheets

FIG. 16

| ADDRESS | SINE VOLTAGE VALUE |
|---|---|
| 0000 | 10HzDATA |
| 0001 | 20HzDATA |
| 0002 | 30HzDATA |
| 0003 | 40HzDATA |
| 0004 | 50HzDATA |
| 0005 | 60HzDATA |
| 0006 | 10HzDATA |
| 0007 | 20HzDATA |
| 0008 | 30HzDATA |
| 0009 | 40HzDATA |
| 0010 | 50HzDATA |
| 0011 | 60HzDATA |
| 0012 | 10HzDATA |
| 0013 | 20HzDATA |
| 0014 | 30HzDATA |
| 0015 | 40HzDATA |

⋮ ⋮

POWER FACTOR COMPENSATION DEVICE FOR MOTOR DRIVING INVERTER SYSTEM

BACKGROUND OF THE INVENTION

1. Field of the Invention

The present invention relates to a technique of controlling a voltage and a current inputted to an inverter driving a motor, and in particular to a power factor compensation device for a motor driving inverter which can compensate a power factor of a voltage and a current inputted to the motor driving inverter.

2. Description of the Background Art

Gradually, an inverter has been increasingly utilized to control a motor for home appliances due to reduction in energy consumption and easiness in output control. Various home appliances including a washing machine and a refrigerator have used an inverter for driving a motor.

FIG. 1 is a structure diagram illustrating a conventional motor driving inverter system. As shown therein, an inputted alternating current power 100 is full-wave rectified by a bridge diode 111 into a direct current voltage. The rectified voltage is smoothed through a choke coil 112 and a smoothing condenser 113, and supplied to an inverter 120. The smoothed direct current voltage is greater than a peak value of the alternating current power voltage. The inverter 120 converts the smoothed direct current voltage into a three phase alternating current power, and supplies it to a motor 130. The motor 130 is driven by the converted three phase alternating current power.

FIG. 2 is a waveform diagram of each unit in the conventional art. A first waveform and a second waveform are voltage and current waveforms of the alternating current power, respectively. A time (t) is determined by a time constant by the choke coil 112 and the smoothing condenser 113, and normally set to be approximately ⅕ of a period of the alternating current power. On the other hand, the peak value of the current is rapidly generated during the time (t). As a result, a noise takes place due to the peak value, and a loss happens due to unavailable power. The aforementioned disadvantage results from a power factor by a phase difference between the voltage and the current. A third waveform of FIG. 2 shows an ideal current pattern of the alternating current power. As shown therein, when a current having an identical phase to a phase of the alternating current power voltage is applied to the inverter, a loss resulting from the unavailable power is removed.

In order to generate a current having such a waveform, a device having a power factor improvement function is shown in FIG. 3.

FIG. 3 is a structure diagram illustrating a conventional power factor compensation device for the inverter system. Here, a power factor compensation unit 200 is further included in the configuration of FIG. 1. The power factor compensation unit 200 includes: the choke coil 112, an analog integrated circuit 210, a plurality of resistances R1–R13, a plurality of condensers C1–C3 and a plurality of diodes D1, D2. FIG. 4 is a detailed circuit diagram illustrating the analog integrated circuit 210. As shown therein, the analog integrated circuit 210 includes various logic circuits.

The direct current voltage outputted from a bridge diode 111 is divided by the resistances R1, R2 of the power factor compensation unit 200, and inputted to the integrated circuit 210 through a terminal 3VM1. The voltage applied to the choke coil 112 is inputted thereto through the resistance R5 and a terminal 5Idet. The voltage of the choke coil 112 passing through the resistance R4 and the diode D1 and the voltage of the bridge diode 111 passing through the resistance R3 become an inside power VCC of the integrated circuit 210. In addition, the direct current voltage supplied to the inverter 120 through the choke coil 112 and the diode D2 is divided by the resistances R11, R12, R13, and inputted to the integrated circuit 210 through a terminal 1̂INV The voltage is inputted to a terminal 2̂COMP after the time constant is controlled by the resistances R7, R8 and the condenser C2. In addition, a voltage corresponding to a current supplied to the inverter 120, namely a voltage passing through the condenser C3 is inputted to a terminal 4CS.

A voltage Vout having a predetermined duty rate is outputted through a terminal V̂out by the various logic circuits in the integrated circuit 210 receiving the voltages, that is comparators 211, 216, 218, 219, a multiplexer 217, an inverter I1, NAND gates 213, 214, a self-starter and a NOR gate 215.

FIG. 5 shows waveforms of the voltages processed in the integrated circuit 210. Reference mark 'MO' denotes a waveform of a voltage inputted from the multiplexer 217 to the comparator 216, and 'CS' denotes a waveform of a voltage inputted to the comparator 216 through the terminal 4CS. As depicted in FIG. 5, MO and CS are compared, and the voltage Vout has a great duty at a portion where a sine wave is small (right and left sides in the drawing), and a small duty at a middle portion.

The voltage Vout is applied to a gate of a switching transistor Q1, and thus the switching transistor Q1 repeatedly performs a switching operation, thereby removing a phase difference between the voltage and current inputted to the inverter 120. Accordingly, the conventional power factor compensation device compensates the power factor by further including the power factor compensation unit, and thus removes the loss. However, there are disadvantages as follows.

Firstly, the power factor compensation unit must constantly receive the alternating current power voltage. Secondly, since the analog power factor compensation circuit is employed, an area for the circuit is increased. Accordingly, a cost thereof is also increased.

SUMMARY OF THE INVENTION

It is therefore a primary object of the present invention to compensate a power factor of a system by storing sine wave form voltage values corresponding to a voltage value of an utility alternating current power in advance, and switching a voltage supplied to an inverter in order to correspond to the stored sine wave form voltage values, in consideration of a phase of the utility alternating current power.

It is another object of the present invention to prevent noise from being generated from a voltage supplied to an inverter.

In order to achieve the above-described objects of the present invention, there is provided a power factor compensation device for a motor driving inverter system, including: an inverter connected to a motor; a microprocessor detecting a zero crossing point of an utility alternating current power, and sequentially outputting a driving signal corresponding to a plurality of sine wave form voltage values according to the detected result, in a state where the plurality of sine wave form voltage values corresponding to a voltage of the utility alternating current power and frequencies are internally stored; and a switching transistor connected in parallel to the inverter, and switched according to the driving signal, a duty of the driving signal being varied correspondingly to each of the plurality of sine wave form voltage values.

BRIEF DESCRIPTION OF THE DRAWINGS

The present invention will become better understood with reference to the accompanying drawings which are given only by way of illustration and thus are not limitative of the present invention, wherein:

FIG. 16 shows patterns of sine wave form voltage values stored in a memory in FIG. 15.

DETAILED DESCRIPTION OF THE PREFERRED EMBODIMENTS

Figure 1:
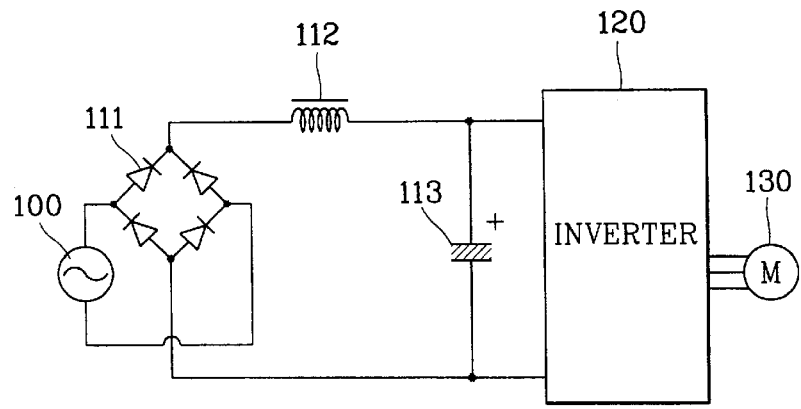
FIG. 1 is a structure diagram illustrating a conventional motor driving inverter system.
Figure 2:
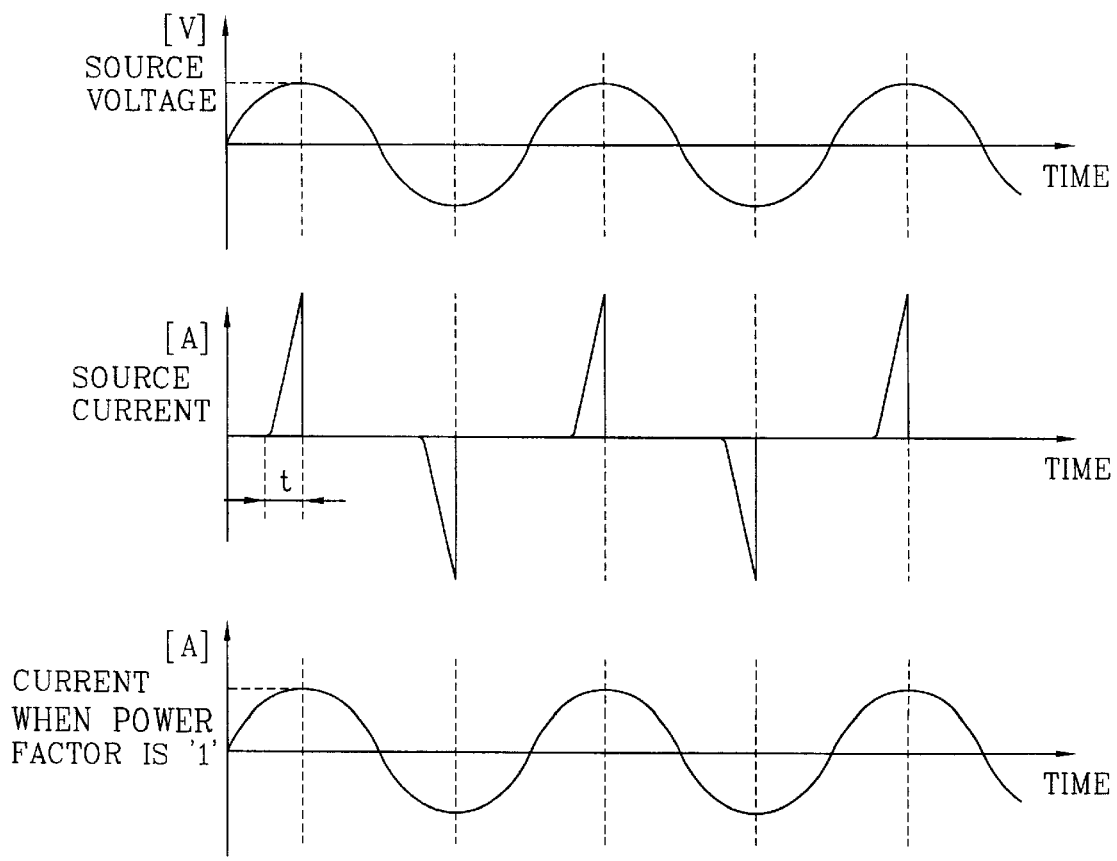
FIG. 2 is a waveform diagram of each unit in the conventional art.
Figure 3:
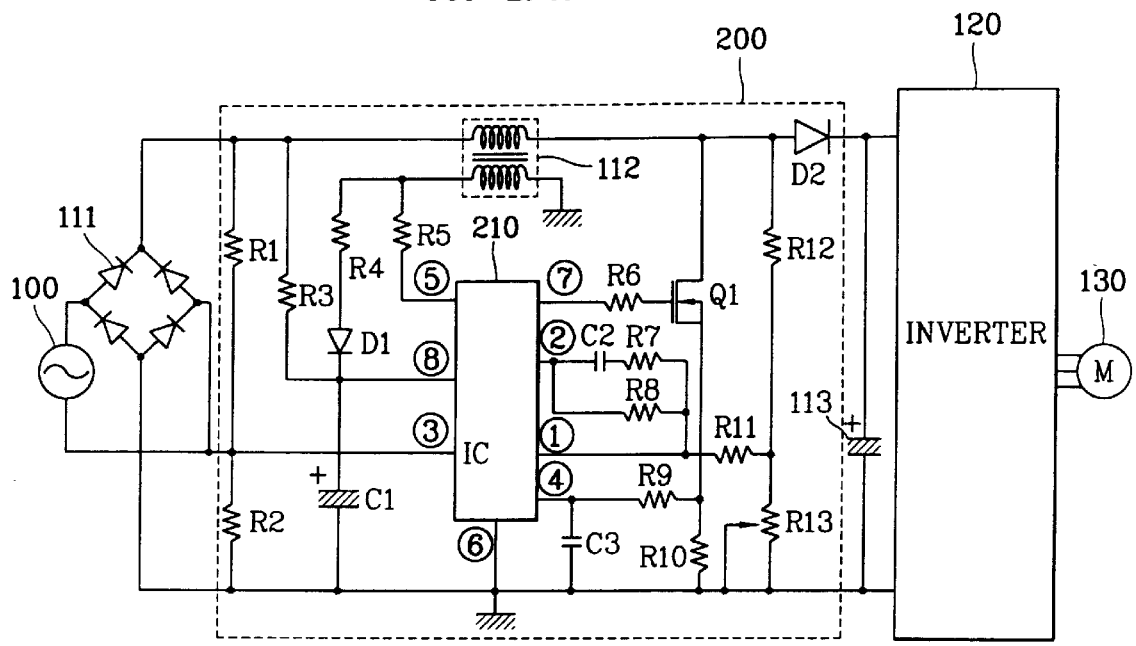
FIG. 3 is a structure diagram illustrating a power factor compensation device for the conventional inverter system.
Figure 4:
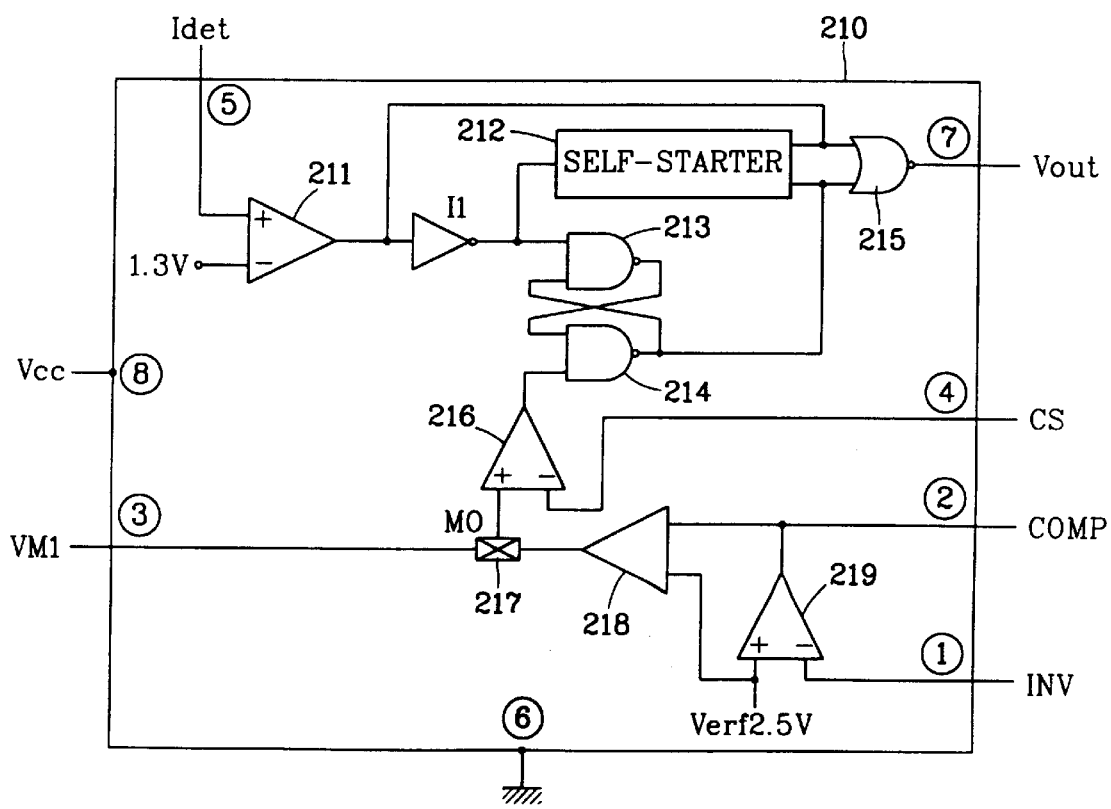
FIG. 4 is a detailed circuit diagram illustrating an integrated circuit in FIG. 3.
Figure 5:
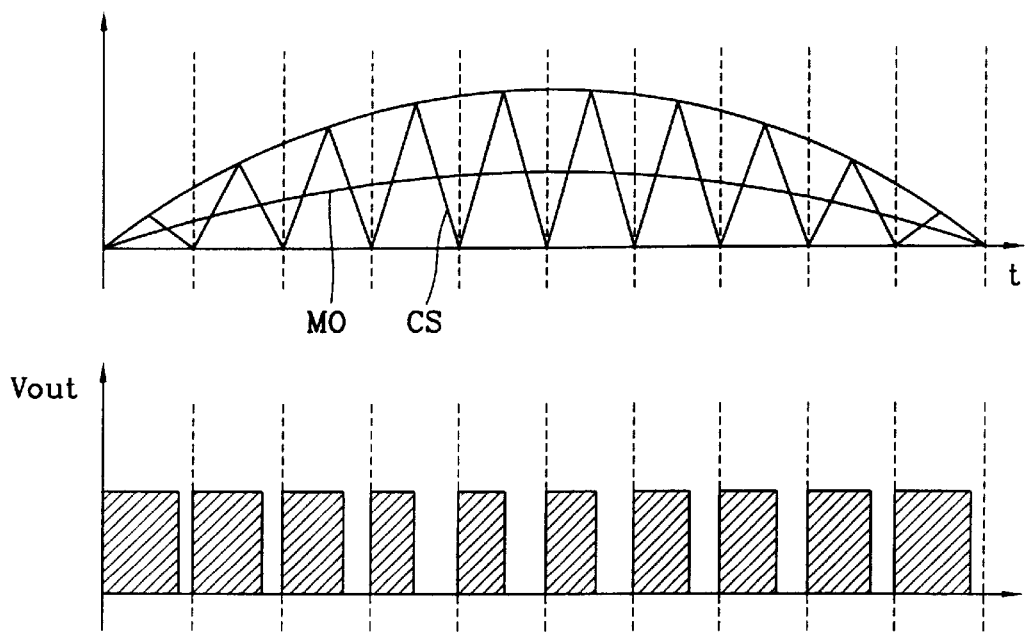
FIG. 5 is a waveform diagram of voltages processed in the integrated circuit in FIG. 3.
Figure 6:
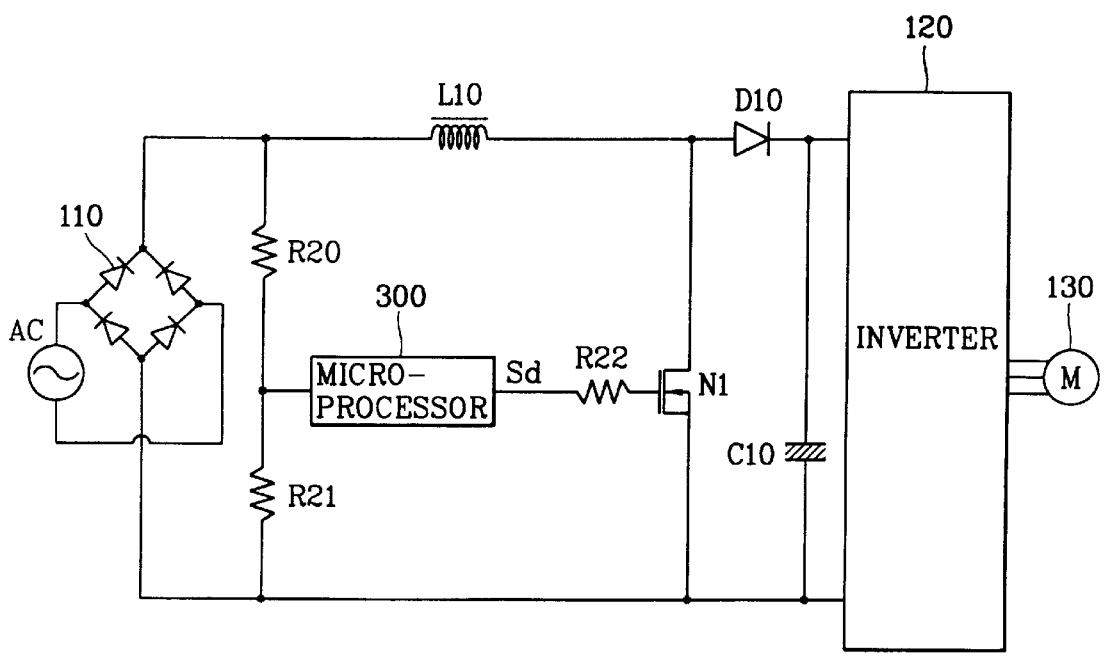
FIG. 6 is a structure diagram illustrating a power factor compensation device for a motor driving inverter system in accordance with a first embodiment of the present invention.

FIG. 6 is a structure diagram illustrating a power factor compensation device for a motor driving inverter system in accordance with a first embodiment of the present invention. As shown therein, the power factor compensation device for the motor driving inverter system includes: an utility alternating current power AC; a bridge diode 110 full wave rectifying the utility alternating current power AC; a choke coil L10 and a diode D10 connected in series to one side output terminal of the bridge diode 110; a smoothing condenser C10 connected to an output terminal of the diode D10, for performing a smoothing operation; an inverter 120 connected in parallel to the smoothing condenser C10, for performing pulse width modulation PWM on the rectified and smoothed utility alternating current power AC, and outputting it; a motor 130 connected to an output terminal of the inverter 120; two resistances R20, R21 connected in series each other, and connected in parallel to the bridge diode 110; a microprocessor 300 receiving a voltage divided by the resistances R20, R21, detecting a zero crossing point of a voltage of the utility alternating current power AC, and outputting a driving signal Sd having a duty varied according to a detection result; and a switching transistor N1 connected to an output terminal of the choke coil L10, and turned on/off according to the driving signal Sd.

Figure 7:
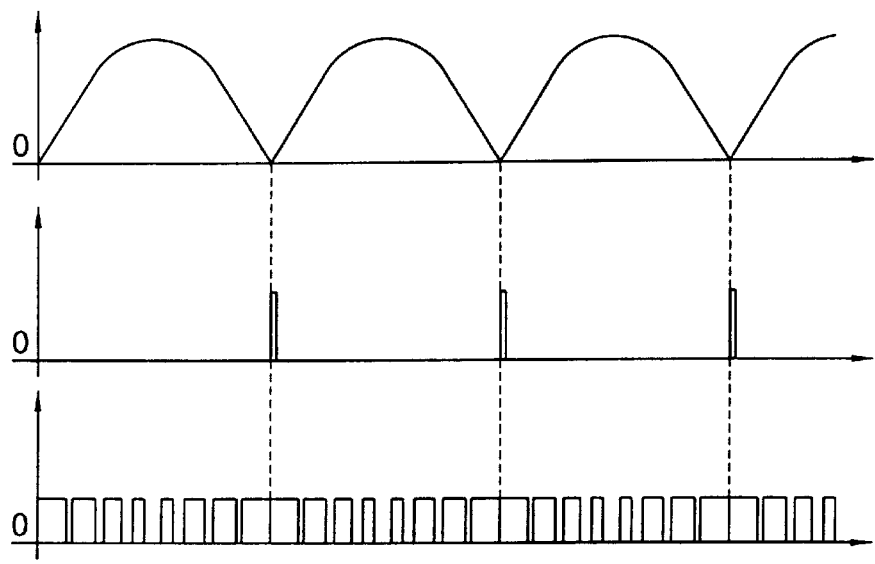
FIG. 7 is a waveform diagram of signals relating to a microprocessor in FIG. 6.

The operation of the power factor compensation device for the motor driving inverter system in accordance with the first embodiment of the present invention will now be described with reference to FIG. 7. FIG. 7 is a waveform diagram of signals relating to the microprocessor.

The bridge diode 110 full wave rectifies an alternating current voltage of the utility alternating current power AC into a direct current, and outputs it. A waveform of the full wave rectified direct current voltage is a first waveform in FIG. 7. The direct current voltage is smoothed in the choke coil L10 and the smoothing condenser C10, and supplied to the inverter 120. The motor 130 is driven by the inverter 120.

At this time, the full wave rectified direct current voltage is divided by the two resistances R20, R21, and inputted to the microprocessor 300. The microprocessor 300 detects the zero crossing point on the basis of the divided voltage, and internally generates a detection pulse. Here, a waveform thereof is a second waveform in FIG. 7.

On the other hand, a plurality of sine wave form voltage values corresponding to a voltage of the utility alternating current power AC and frequencies are stored in the microprocessor 300 in advance. Here, a waveform thereof is a third waveform of FIG. 7. The voltage values are used to determine a duty of a switching control signal outputted to the switching transistor N1. The ON time of the switching transistor N1 is determined according to the voltage values. The terminology, 'sine wave form' is used to imply that a pattern of the voltage of the utility alternating current power AC has a sine wave form, and that a pattern of the voltage stored in the microprocessor 300 is identical to the pattern of the voltage of the utility alternating current power AC. In addition, the frequency is set identically to the frequency of the utility alternating current power AC.

When the detection pulse corresponding to the zero crossing point is internally generated, the microprocessor 300 sequentially generates the sine wave form voltage values, and outputs the driving signal Sd corresponding to the plurality of voltage values. The driving signal Sd is applied to the switching transistor N1 through the resistance R22. When the switching transistor N1 is switched, the full wave rectified direct current voltage is intermittently supplied to the inverter 120.

The above-described operation is carried out for half a period of the full wave rectified utility alternating current power AC, namely from a detection time of the zero crossing point of the voltage of the utility alternating current power AC to a detection time of a succeeding zero crossing point. Whenever the zero crossing point is detected, the operation is repeatedly performed. Accordingly, a phase of the voltage and current inputted into the inverter 120 becomes identical to a phase of the voltage and current of the utility alternating current power AC, thereby compensating the power factor of the voltage and current inputted to the inverter 120.

On the other hand, as described above, the microprocessor 300 detects the zero crossing point, generates the sine wave form voltage, and outputs the driving signal Sd. However, this operation may be separately performed by the various constitutional elements, which will now be explained in accordance with a second embodiment of the present invention.

Figure 8:
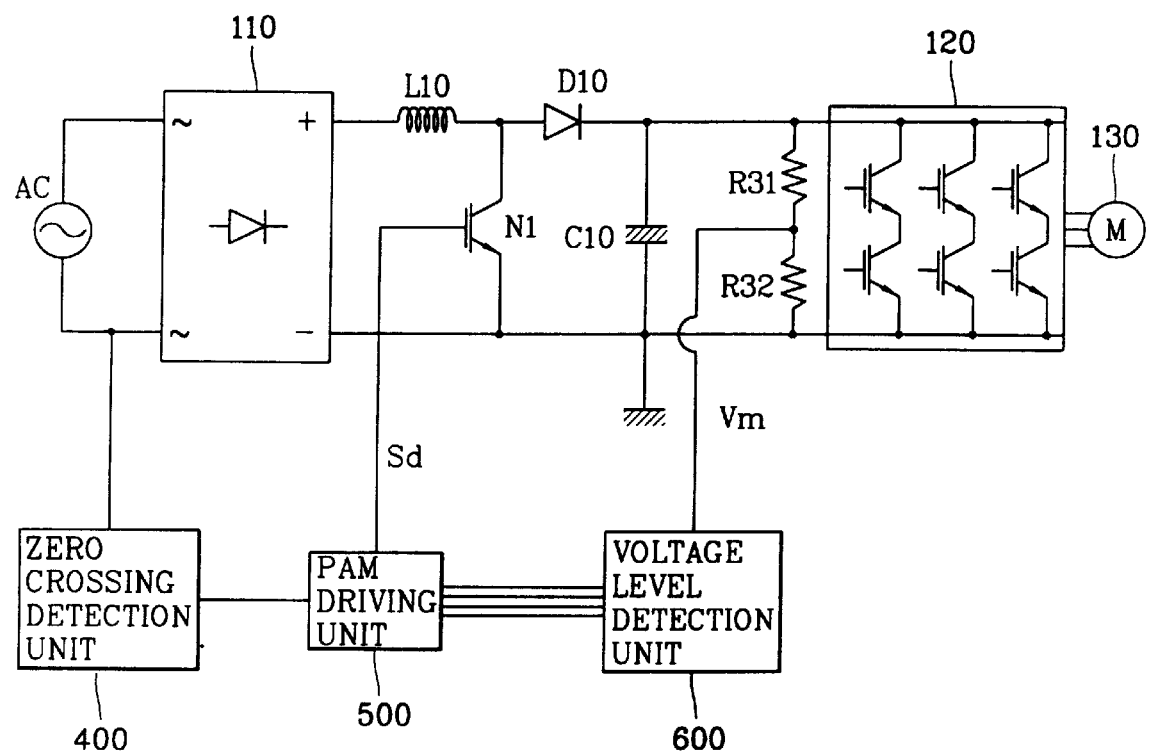
FIG. 8 is a structure diagram illustrating a power factor compensation device for a motor driving inverter system in accordance with a second embodiment of the present invention.

FIG. 8 is a structure diagram illustrating a power factor compensation device for a motor driving inverter system in accordance with the second embodiment of the present invention. As shown therein, a zero crossing detection unit 400 serves to detect the zero crossing point of the utility alternating current power AC, replacing the microprocessor 300 in FIG. 6. That is, the zero crossing detection unit 400 detects the zero crossing point of the utility alternating current power AC, and outputs a zero crossing input to a pulse amplitude modulation (PAM) driving unit 500. The PAM driving unit 500 outputs the driving signal Sd having a duty varied according to the detected zero crossing point to the switching transistor N1, replacing the microprocessor 300.

On the other hand, a voltage level detection unit 600 serves to consider a level of a voltage when the rectified direct current voltage is switched by the switching transistor N1 and supplied to the inverter 120. That is, the voltage level detection unit 600 divides the direct current voltage supplied to the inverter 120, outputs the divided voltage Vm to the PAM driving unit 500, and carries out the function added in the first embodiment. Accordingly, the PAM driving unit 500 outputs the driving signal Sd in consideration of a level of the voltage supplied to the inverter 120. That is, the PAM driving unit 500 outputs the driving signal Sd by considering the zero crossing point of the utility alternating current power AC and the voltage level inputted to the inverter 120. The switching transistor N1 is switched according to the driving signal Sd, thereby compensating the power factor of the voltage or current inputted to the inverter 120.

The operation of the PAM driving unit 500 will now be described in detail with reference to FIGS. 9 and 10.

Figure 9:
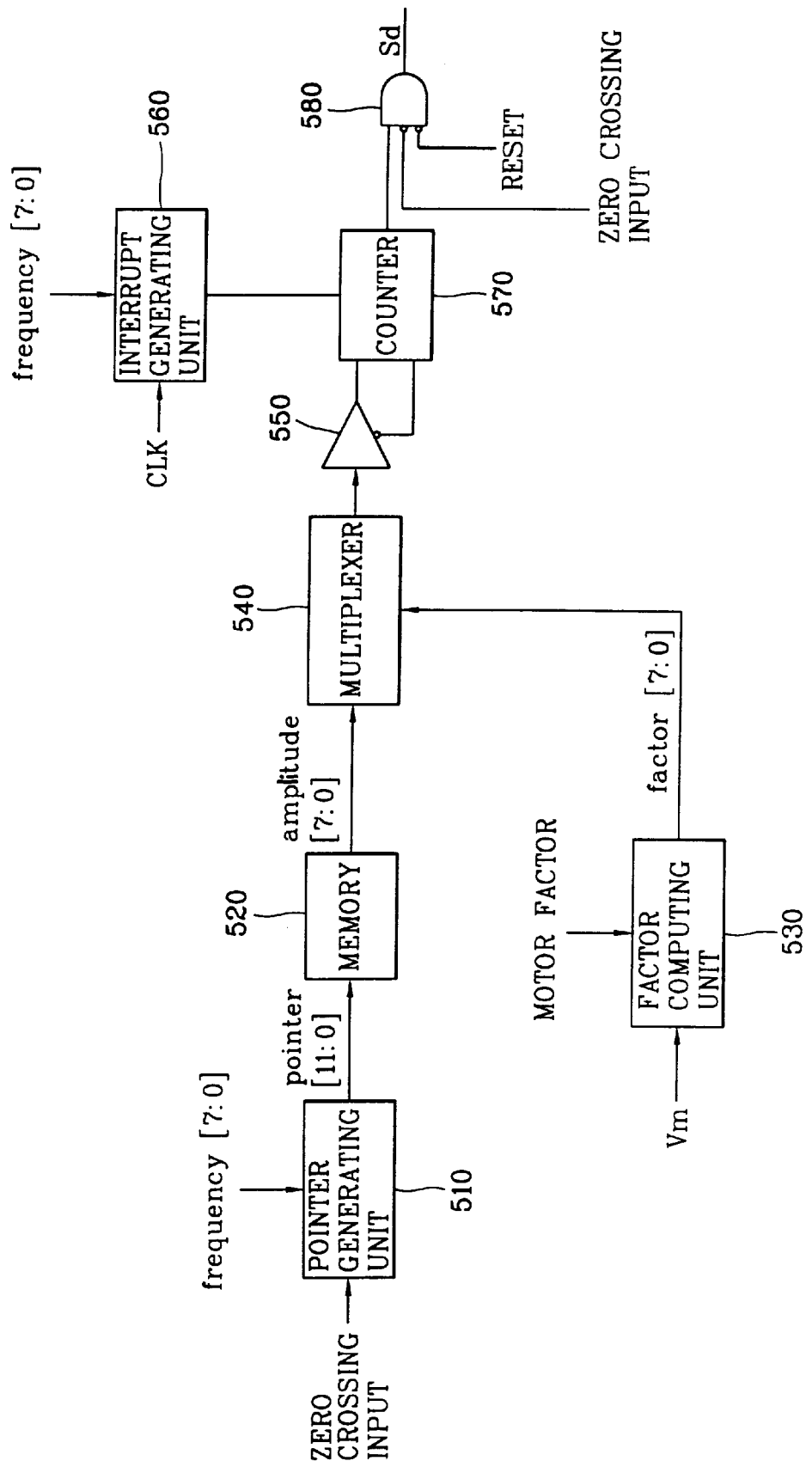
FIG. 9 is a detailed structure diagram illustrating a PAM driving unit in accordance with the second embodiment of the present invention.

FIG. 9 is a detailed structure diagram illustrating the PAM driving unit 500 in accordance with the second embodiment of the present invention. As shown therein, the PAM driving unit 500 includes: a pointer generating unit 510 receiving the zero crossing input, generating a pointer signal, sequentially adding an operational frequency value of the system into the pointer value, and outputting it; a memory 520 storing in advance sine wave form voltage values corresponding to the voltage of the utility alternating current power AC, and outputting the sine wave form voltage values stored in an address designated according to the pointer signal from the pointer generating unit 510; a factor computing unit 530 outputting a factor value reflecting a characteristic factor of the motor 130, the divided voltage Vm from the voltage level detection unit 600 in FIG. 8, the performance of the whole system and the specification of the motor; a multiplexer 540 multiplying the factor value by the output value of the memory 520, and outputting it; a three phase buffer 550 passing or intercepting the output value from the multiplexer 540 according to a disable signal; an interrupt generating unit 560 outputting an interrupt signal whenever a predetermined number of clocks corresponding to the previously-set operational frequency value of the system are generated; a counter 570 loading and outputting the output value from the multiplexer 540 by starting a count operation when receiving the interrupt signal, and applying the disable signal to the three phase buffer 550 based on the loaded value; and an AND gate receiving an output value from the counter 570, inverting and receiving the zero crossing input, and inverting and receiving a reset signal. Here, the frequency inputted to the pointer generating unit 510 and the interrupt generating unit 560 is the system operational frequency.

The operation of the PAM driving unit 500 will now be described in detail.

When the zero crossing input is inputted, the pointer generating unit 510 is initialized, thereby generating a pointer. The pointer is added to the operational frequency of the system, and outputted as a pointer signal. Here, the point signal is a signal for designating the address of the memory 520. On the other hand, the memory 520 stores the sine wave form voltage values outputted while the zero crossing point is generated, namely a voltage corresponding to the sine wave from a detection time of the zero crossing point to a detection time of a succeeding zero crossing point. That is, in the preferred embodiment of the present invention, the zero crossing point is detected whenever a phase of the utility alternating current power AC is 180°, and thus the voltage values corresponding to 180° of the sine wave are stored. In case the zero crossing point is detected whenever the phase of the utility alternating current power AC is 360°, the voltage values corresponding to 360° of the sine wave must be stored. The memory 520 may be replaced by the RAM or ROM, if necessary. When the address of the memory 520 is designated according to the pointer signal, the sine wave form voltage values stored in the address are outputted.

The factor computing unit 530 outputs the factor value reflecting the characteristic factor of the motor 130, the divided voltage Vm outputted from the voltage level detection unit 600 in FIG. 8, the performance of the whole system, and the specification of the motor. The factor value is multiplied by the sine wave form voltage value outputted from the memory 520. The multiplied value is inputted to the counter 570 through the three phase buffer 550.

On the other hand, the factor computing unit 530 is necessary to perform a precise control operation according to the motor system, and thus may not be used. In case the factor computing unit 530 is not employed, the multiplexer 540 is not necessary. At this time, the output voltage from the memory 520 is inputted to the buffer 550.

When receiving the interrupt signal generated from the interrupt generating unit 560, the counter 570 counts the value inputted through the three phase buffer 550, and outputs a high level signal to the AND gate 580. In addition, the counter 570 outputs a low level disable signal to the three phase buffer 550 during the count operation, and outputs a high level disable signal to the three phase buffer 550 when finishing the count operation. The three phase buffer 550 passes the output from the multiplexer 540 when the disable signal is at a high level, and intercepts it when the disable signal is at a low level.

The AND gate 580 outputs the value counted when the reset signal and the zero crossing input are all at a low level to the switching transistor N1 as the driving signal Sd. That is, in case any of the system reset signal and the zero crossing input is at a high level, the AND gate 580 does not output the driving signal Sd.

The above-described operation is performed while the sine wave form voltage values stored in the memory 520 are sequentially outputted according to the pointer signal outputted from the pointer generating unit 510. On the other hand, when a predetermined time lapses, a succeeding zero crossing point of the utility alternating current power AC is detected, and thus the zero crossing input is inputted, the whole sine wave form voltage values are repeatedly outputted.]A power factor compensation device for a motor driving inverter system in accordance with a third embodiment of the present invention will now be described. Among the sine wave voltage values stored in the memory according to the second embodiment, the sine wave voltage values in regard to 0° to 90° and the sine wave voltage values in regard to 0° to 180° are symmetric. The third embodiment of the present invention utilizes such a property. When the zero crossing point is detected at every 180° of the utility alternating current power AC, the sine wave voltage values in regard to 0° to 90° are stored in the memory, and repeatedly outputted.

That is, in accordance with the third embodiment, in a state where the sine wave voltage values corresponding to a quarter period (90°) of the sine wave (half a period of the utility alternating current power AC) are stored in the memory, if the phase of the utility alternating current power AC is 0° to 90°, the address of the memory is sequentially increased and designated, and if the phase of the utility alternating current power AC is 90° to 180°, the address of the memory is sequentially decreased and designated. Accordingly, each of the sine wave voltage values stored in the memory is outputted twice while the zero crossing point is detected. As another example, in case the zero crossing point is detected at every 360° of the utility alternating current power AC, the voltage values corresponding to 180° of the sine wave must be stored in the memory, and outputted twice. As a result, a size of the memory is reduced into a half, as compared with the memory in the second embodiment. Nevertheless, the identical result to the second embodiment can be obtained. The operation of the third embodiment of the present invention will now be described in detail with reference to FIGS. 10 and 11.

Figure 10:
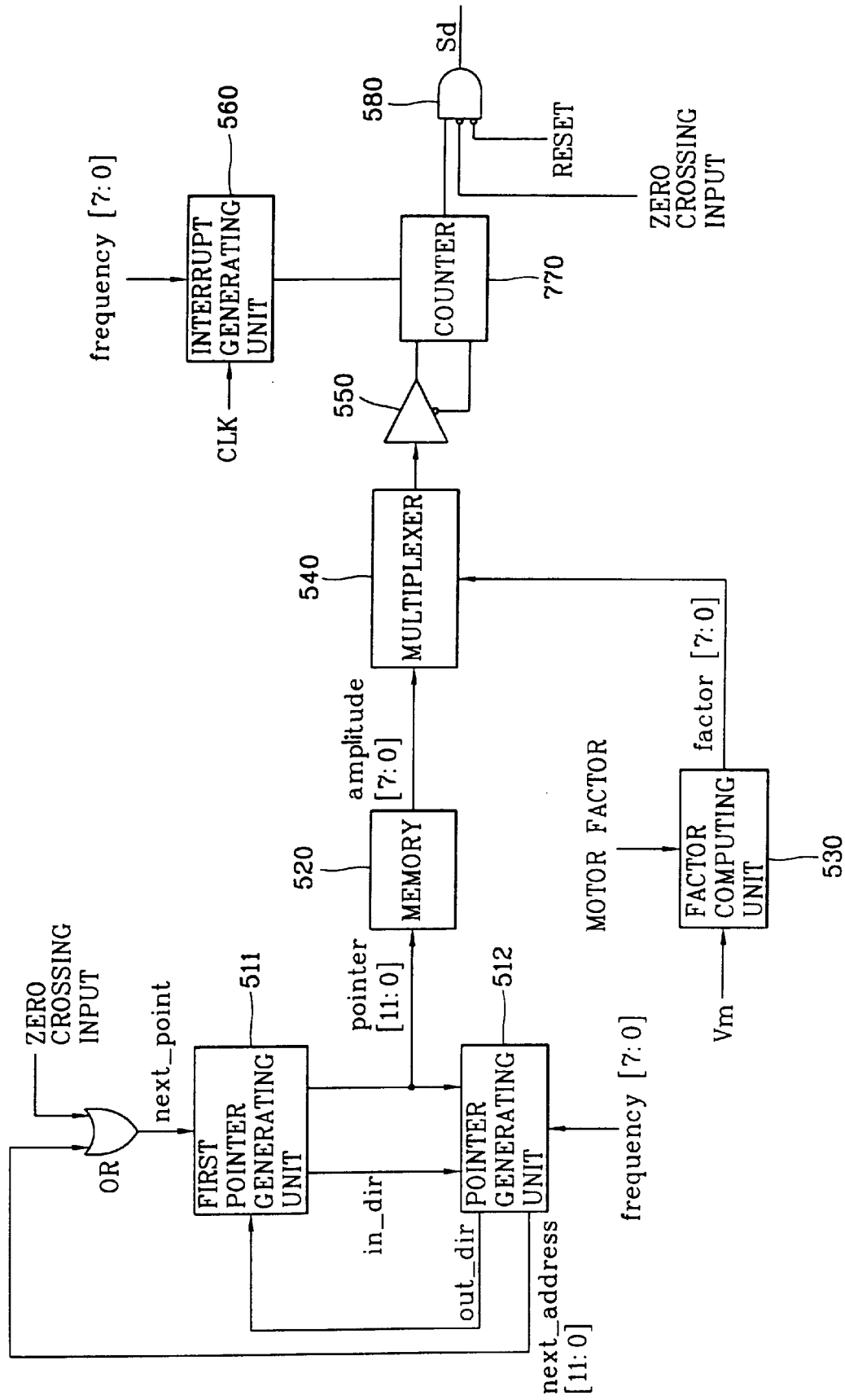
FIG. 10 is a detailed structure diagram illustrating a PAM driving unit in accordance with a third embodiment of the present invention.
Figure 11:
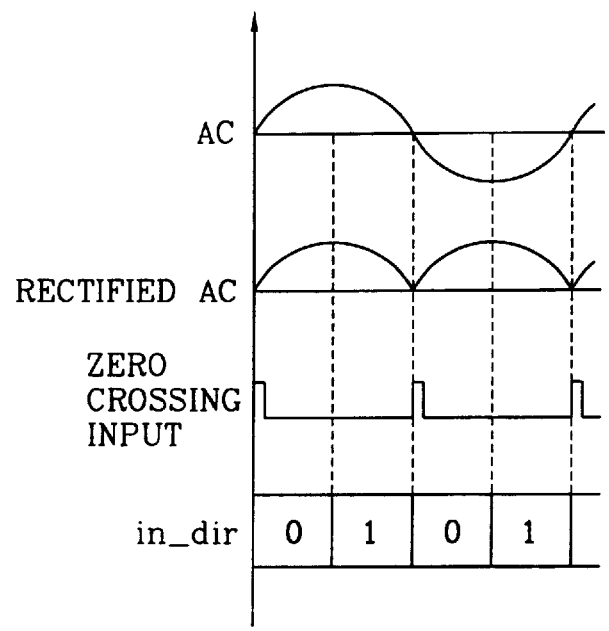
FIG. 11 is a waveform diagram of output signals from each unit in accordance with the third embodiment of the present invention.

FIG. 10 is a detailed structure diagram illustrating the PAM driving unit 500 in accordance with the third embodiment of the present invention. An OR gate OR, a first pointer generating unit 511 and a second pointer generating unit 512 correspond to the pointer generating unit 510 in the second embodiment. The number of the sine wave voltage values stored in the memory 520 is nothing but a half of the number of values stored in the memory in the second embodiment. FIG. 11 is a waveform diagram of output signals from each unit in a state where the zero crossing point is detected at every 180° of the utility alternating current power AC, and the voltage value corresponding to 90° of the sine wave is stored in the memory, in accordance with the third embodiment of the present invention.

As shown in FIG. 10, the OR gate OR Ors the zero crossing input and a next address signal, the first pointer generating unit 511 receives an output signal from the OR gate OR, and generates a pointer signal and a period adjustable signal in_dir, and the second pointer generating unit 512 adds or subtracts the operational frequency of the system to/from the pointer signal according to the period adjustable signal in_dir, and generates a resultant next address signal. The memory 520 stores the sine wave voltage values corresponding to 90° of the sine wave, namely the half period of the full wave rectified utility alternating current power AC. When the address is designated by a pointer outputted from the first pointer generating unit 511, the memory 520 outputs the sine wave voltage values stored in the address. On the other hand, a period variation signal out_dir which is outputted from the second pointer generating unit 512 to the first point generating unit 511 is used in a fourth embodiment of the present invention, which will be explained later.

Here, the period adjustable signal in_dir is a signal for obtaining a next address of the memory, namely a signal for determining to increase or decrease the next address of the memory. As illustrated in FIG. 11, the period adjustable signal in_dir is at a low level when the phase of the utility alternating current power AC is 0° to 90°, and at a high level when the phase of the utility alternating current power AC is 90° to 180°, and 270° to 360°. When the period adjustable signal in_dir is at a low level, the second pointer generating unit 512 adds the operational frequency to the current address. In case the period adjustable signal in_dir is at a high level, the second pointer generating unit 512 subtracts the operational frequency from the current address. The other constitutional elements are identical to the second embodiment, and thus a detailed explanation thereof will be omitted. The operation of the OR gate OR, and the first and second pointer generating units 511, 512 will now be described.

When receiving the zero crossing input, the OR gate OR outputs a high signal to the first pointer generating unit 511, thereby initializing the first pointer generating unit 511. Accordingly, the first pointer generating unit 511 outputs the pointer signal designating a first address of the memory 520, and also outputs the period adjustable signal in_dir at a low level. The first address of the memory 520 is designated according to the pointer signal, and thus the sine wave voltage values stored in the first address are outputted. Since the period adjustable signal in_dir is at a low level, the second pointer generating unit 512 computes the next address by adding the operational frequency to the current address, and outputs it to the OR gate OR. The first pointer generating unit 511 outputs a pointer designating a succeeding address of the memory 520 according to the next address passing through the OR gate OR. Accordingly, the memory 520 outputs the sine wave voltage values stored in the succeeding address to the first address. Here, the first pointer generating unit 511 maintains the period adjustable signal in_dir at a low level until the phase of the utility alternating current power AC reaches to 90°.

When the above-described operation is repeatedly performed, and thus the voltage value corresponding to 90° of the sine wave is operated, the first pointer generating unit 511 outputs the pointer signal designating the last address of the memory, and also outputs the period adjustable signal in_dir at a high level. The sine wave voltage values stored in the last address are outputted from the memory 520 according to the pointer signal. At the same time, the second pointer generating unit 512 computes the next address by subtracting the operational frequency from the current address according to the high level period adjustable signal in_dir, and outputs the next address to the OR gate OR. The first pointer generating unit 511 subtracts the subtracted next address from the previous pointer value, and outputs the pointer value, and maintains the period adjustable signal in_dir at a high level until the phase of the utility alternating current power AC reaches into 180°. For instance, when the phase of the utility alternating current power AC is 160° (180°–20°), the voltage values corresponding to 20° of the sine wave are outputted.

As stated above, after the zero crossing input is inputted, while the phase of the utility alternating current power AC is 0° to 90°, the pointer is increased, and the voltage values corresponding to 0° to 90° of the sine wave are sequentially outputted. While the phase of the utility alternating current power AC is 90° to 180°, the pointer is decreased, and the voltage values corresponding to 0° to 90° are outputted in the reverse order. Accordingly, although the sine wave voltage values corresponding to a half of the necessary sine wave voltage values are stored in the memory 520, the values corresponding to the half period of the utility alternating current power AC (one period of the rectified utility alternating current power AC) can be outputted. As a result, according to the third embodiment, a size of the memory is reduced into a half, as compared with the memory in the second embodiment. Nevertheless, the identical result can be obtained to the second embodiment.

Figure 12:
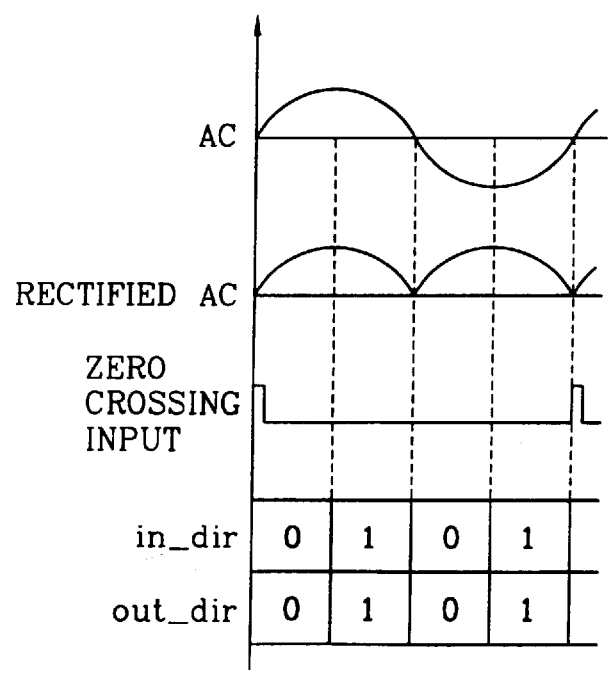
FIG. 12 is a waveform diagram of output signals from each unit in accordance with a fourth embodiment of the present invention.

A power factor compensation device for a motor driving inverter system in accordance with a fourth embodiment of the present invention will now be described with reference to FIGS. 10 and 12. In the fourth embodiment, when the zero crossing point is detected at every 360° of the utility alternating current power AC, the sine wave voltage values in regard to 0° to 90° are stored in the memory, and repeatedly outputted.

According to the fourth embodiment, in a state where the sine wave voltage values corresponding to a quarter period of the utility alternating current power AC are stored in the memory, when the phase of the utility alternating current power AC is 0° to 90° and 180° to 270°, the address of the memory is sequentially increased and designated. In case the phase of the utility alternating current power AC is 90° to 180° and 270° to 360°, the address of the memory is sequentially decreased and designated. Therefore, each of the sine wave voltage values stored in the memory is outputted four times while the zero crossing point is detected. While the respective sine wave voltage values are outputted two times in the third embodiment, the respective sine wave voltage values are outputted four times in the fourth embodiment.

The fourth embodiment of the present invention is performed in the device as shown in FIG. 10, which will now be described in detail with reference to FIG. 12. FIG. 12 is a waveform diagram of output signals from each unit in a state where the zero crossing point is detected at every 360° of the utility alternating current power AC, and the voltage values corresponding to 90 of the sine wave are stored in the memory, in accordance with the fourth embodiment of the present invention.

The operation of the first pointer generating unit 511 and the second pointer generating unit 512 in the fourth embodiment will now be described in detail. The operation of the other constitutional elements is identical to the second and third embodiments, and thus an explanation thereof will be omitted.

The first pointer generating unit 511 receives the next address inputted through the OR gate OR and the period variation signal out_dir from the second pointer generating unit 512, outputs the pointer signal, and also outputs the period adjustable signal in_dir. The second pointer generating unit 512 generates the next address signal by subtracting the operational frequency of the system from the pointer signal according to the pointer signal and the period adjustable signal in_dir inputted from the first pointer generating unit 511, judges whether a carry is generated in the next address signal, and outputs the period variation signal out_dir to the first pointer generating unit 511. When the carry takes place, the period variation signal out_dir is outputted at a low level. In case the carry does not take place, the period variation signal out_dir is outputted at a high level.

In order to explain the operation of the first pointer generating unit 511, intermediate values a, b (not shown) and a polarity value are utilized. Here, the intermediate values a, b are temporarily used to map the phase of the utility alternating current power AC (0° to 360°) to the phase of the sine wave voltage (0° to 90°) stored in the memory 520. The polarity value is employed to compute the intermediate values a, b. When the polarity value is '0', it implies 'a+b' operation, and when the polarity value is '1', it implies 'a−b' operation.

When the phase of the utility alternating current power AC is mapped to the phase of the sine wave voltage, a relation is formed as shown in the following table. Here, reference mark Pac denotes the phase of the utility alternating current power AC.

| Phase of utility alternating current power AC | A [15:0] | b [15:0] | Polarity value | Phase of sine wave voltage stored in memory |
|---|---|---|---|---|
| 0°–90° | Pac | 0 | 0 | a + b = Pac + 0 |
| 90°–180° | 180° | Pac | 1 | a − b = 180 − Pac |
| 180°–270° | Pac | 180° | 1 | a − b = Pac − 180 |
| 270°–360° | 180° | Pac | 1 | a − b = 360 − Pac |

In the above table, actually, "the phase of the sine wave voltage stored in the memory" does not exist, but is introduced for convenience sake. That is, the phase of the sine wave voltage is a concept corresponding to the address of the sine wave voltage stored in the memory 520, and a concept corresponding to the pointer value which the first pointer generating unit 511 outputs the memory 520.

The four cases will now be exemplified on the basis of the table.

Firstly, when the phase of the utility alternating current power AC is 0° to 90°, the first pointer generating unit 511 generates the pointer value corresponding to the phase, and thus the address is designated in the memory 520. Accordingly, the sine wave voltage values stored in the address are outputted.

Secondly, when the phase of the utility alternating current power AC is 160°, the first pointer generating unit 511 outputs 180° to 160°, namely the pointer value corresponding to 20° of the utility alternating current power AC.

Thirdly, when the phase of the utility alternating current power AC is 210°, the first pointer generating unit 511 outputs 210° to 180°, namely the pointer value corresponding to 30° of the utility alternating current power AC.

Fourthly, when the phase of the utility alternating current power AC is 340°, the first pointer generating unit 511 outputs 360° to 340°, namely the pointer value corresponding to 20° of the utility alternating current power AC.

As described above, the first pointer generating unit 511 outputs the pointer value by using the intermediate value a+b, when receiving the zero crossing input through the Or gate OR. The second pointer generating unit 512 computes a succeeding pointer value next_address by adding/subtracting the system operational frequency to/from the period adjustable signal in_dir, and computes the period variation signal out_dir by adding/subtracting the system operational frequency to/from the succeeding pointer value on the basis of the period adjustable signal in_dir and the succeeding pointer value.

In more detail, when the period adjustable signal in_dir is '0', the phase of the utility alternating current power AC is 0° to 90° and 180° and 270°. Accordingly, the system operational frequency is added to the inputted pointer value, and outputted as the succeeding pointer value next_address. In case the period adjustable signal in_dir is '1', the phase of the utility alternating current power AC is 90° to 180° and 270° and 360°. Therefore, the system operational frequency is subtracted from the inputted pointer value, and outputted as the succeeding pointer value next_address.

In addition, when the carry is not generated during the computation of the succeeding pointer value next_address, the phase of the utility alternating current power AC is constantly between 90° and 180° or 270° and 360°, and thus the period variation signal out_dir is outputted at a high level. In case the carry is generated, the phase of the utility alternating current power AC is over 180° or 360°, and thus the period variation signal out_dir is outputted at a low level.

As discussed earlier, in accordance with the fourth embodiment of the present invention, the sine wave voltage values stored in the memory are outputted four times for one period of the utility alternating current power AC (360°), thereby reducing a size of the memory.

Figure 14:
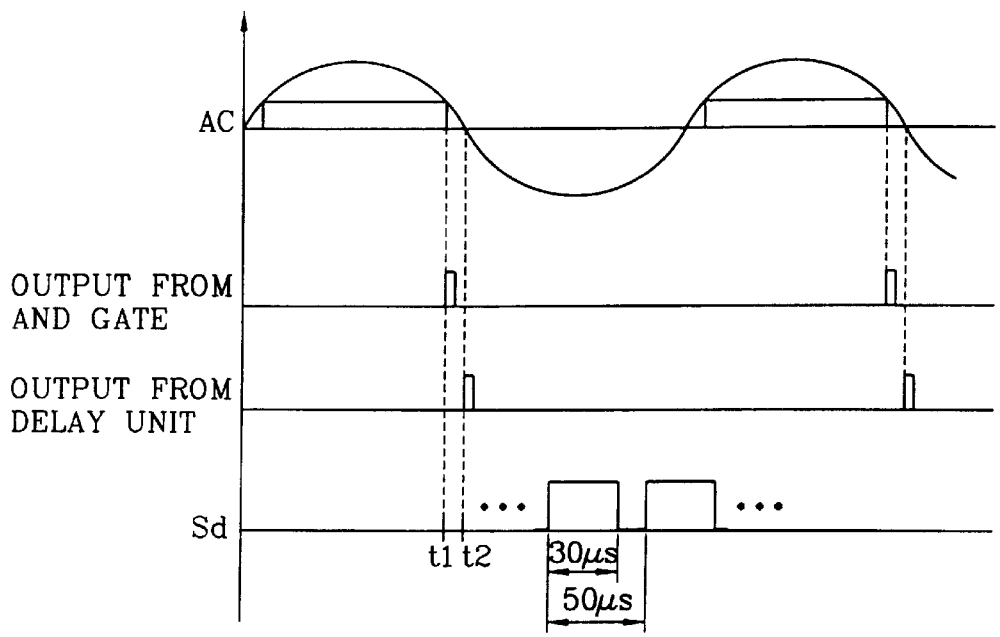
FIG. 14 is a waveform diagram of each unit in FIG. 13.

Although the detection values of the zero crossing point are directly used in the first to fourth embodiments of the present invention, a slight difference exists between the actual zero crossing point of the utility alternating current power AC and the detected zero crossing point thereof. As illustrated in FIG. 14, the zero crossing of the actual utility alternating current power AC is generated at a point t2. However, the zero crossing point is detected at a point t1 due to characteristics of the circuit. Accordingly, in order to precisely compensate the power factor, the system must be operated on the basis of the actual zero crossing point.

The PAM driving unit 500 in accordance with a fifth embodiment of the present invention compensates an error time t2−t1 of the zero crossing point, and drives the switching transistor N1 based on the compensated time, thereby enabling the system to be operated on the basis of the actual zero crossing point. The operation of the PAM driving unit 500 according to the fifth embodiment of the present invention will now be described in detail. For convenience sake, it will now be exemplified that the zero crossing point is detected per one period of the utility alternating current power AC, and the sine wave voltage values corresponding to the half period of the utility alternating current power AC are stored in the memory.

Figure 13:
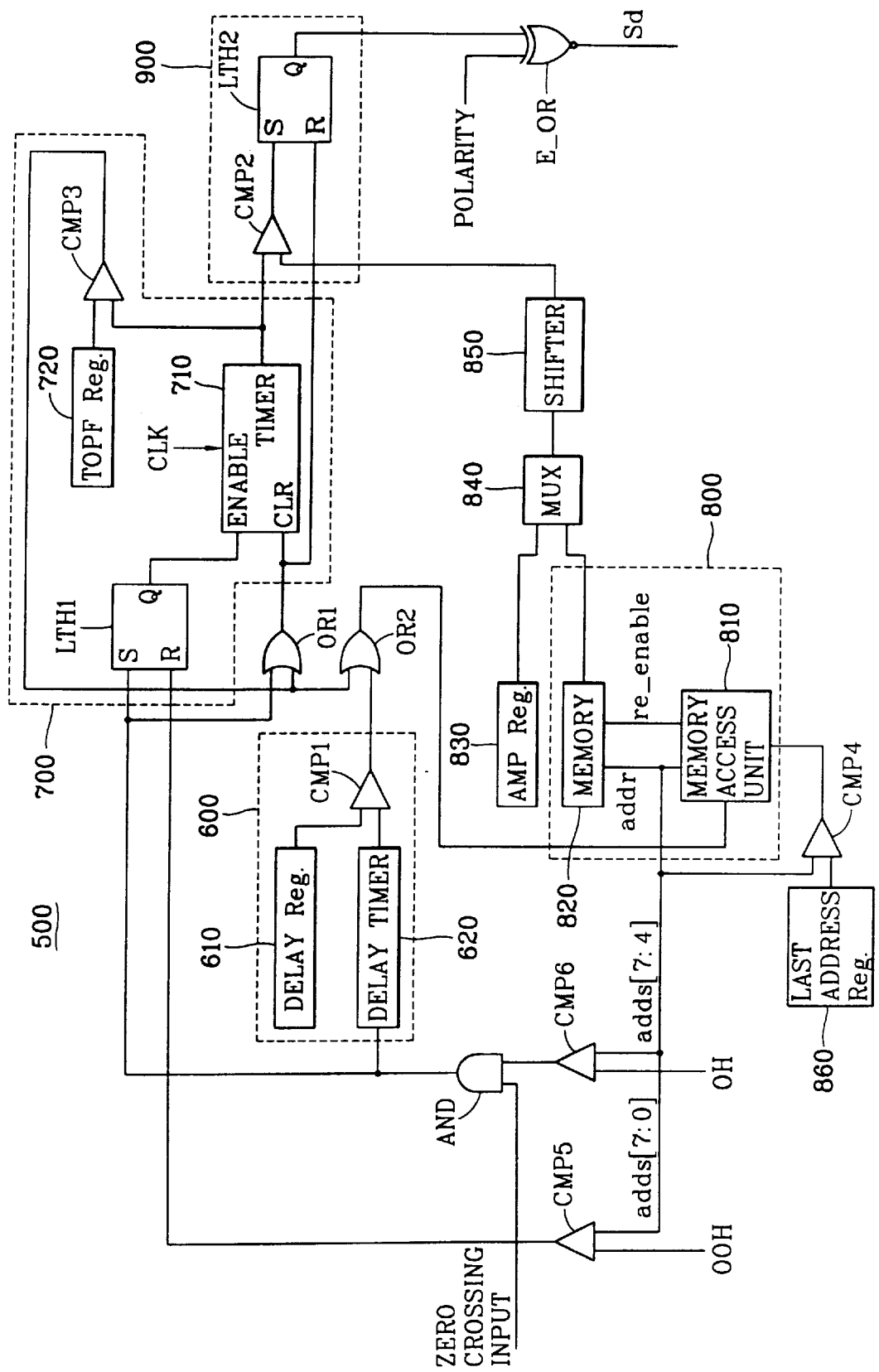
FIG. 13 is a detailed structure diagram illustrating a PAM driving unit in accordance with a fifth embodiment of the present invention.

The fifth embodiment of the present invention will now be explained with reference to FIGS. 13 and 14. FIG. 13 is a detailed structure diagram illustrating the PAM driving unit 500 in accordance with the fifth embodiment of the present invention, and FIG. 14 is a waveform diagram of each unit in FIG. 13.

As illustrated in FIG. 13, the PAM driving unit 500 includes: a delay unit 600 delaying the zero crossing input for a predetermined time and outputting it, when receiving the zero crossing input; a switching period count unit 700 starting a count operation according to the zero crossing input, and outputting a count completion signal Sc, when counting as long as a switching period; a memory unit 800 internally storing a plurality of sine wave form voltage values corresponding to a voltage of the utility alternating current power AC and frequencies, and enabled according to the delayed zero crossing input or the count completion signal Sc for outputting the sine wave form voltage value; and a latch unit 900 enabled according to the zero crossing input and the count completion signal Sc, and disabled when a time corresponding to the sine wave form voltage value is identical to a time counted in the switching period count unit 700, for outputting the driving signal Sd.

The delay unit 600 includes: a delay timer 610 starting the count operation, when receiving the zero crossing input; a delay register 620 having a previously-set error time; and a first comparator CMP1 outputting the delayed zero crossing input, when the error time lapses.

The switching period count unit 700 includes: a first latch LTH1 set according to the zero crossing input; a timer 710 enabled by the first latch, for starting the count operation; a TOPF register 720 storing the time corresponding to the switching period; and a third comparator CMP3 outputting the count completion signal Sc, when the counted time is identical to the time stored in the TOPF register 720.

The memory unit 800 includes a memory access unit 810 enabled according to the delayed zero crossing input or the count completion signal SC, for outputting an address signal and a read enable signal rd_enable; and a memory unit 820 internally storing the plurality of sine wave form voltage values corresponding to the voltage of the utility alternating current power AC and frequencies, and read-enabled according to the read enable signal rd_enable, for outputting the sine wave form voltage stored in an address designated according to the address signal.

The latch unit 900 includes: a second comparator CMP2 comparing the time corresponding to the sine wave form voltage value with the time counted in the switching period count unit 700, and outputting a resultant signal; and a second latch LTH2 reset according to an output from the second comparator CMP2, for outputting the driving signal Sd.

The operation of the fifth embodiment of the present invention will now be described.

The zero crossing input is inputted to the delay timer 610 of the delay unit 600 through the AND gate AND, inputted to the first latch LTH1 of the switching period generating unit 700, and inputted to a first OR gate OR1. The second latch LTH2 is set according to the output from the first OR gate OR1. Accordingly, an output from the second latch LHT2 is enabled at a high level, passed through an exclusive OR gate E-OR, and applied to the switching transistor N1 as the driving signal N1.

The error time t2−t1 is set in the delay register 620 of the delay unit 600. After the delay timer 610 starts the count operation according to the zero crossing input, when the error time t2−t1 set in the delay register 620 lapses, the output from the first comparator CMP1 becomes a high level at the point t2. The output from the first comparator CMP1 enables the memory access unit 810 through a second OR gate OR2. Therefore, the memory access unit 810 outputs a first address signal and the read enable signal rd_enable to the memory 820. The read-enabled memory 820 outputs the internally-stored sine wave voltage value. The value is multiplied by a motor factor value set in an AMP register 830, shifted in a shifter 850, and inputted to the second comparator CMP2. The input value is a time for the driving signal Sd to be outputted at a high level, and a time for determining the ON time of the switching transistor N1.

The first latch LTH1 of the switching period generating unit 700 receiving the zero crossing input enables the timer 710, and thus the timer 710 starts the count operation. The counted value is inputted to the first comparator CMP2 and a third comparator CMP3. When the counted value is identical to an output value of the shifter 850, the output from the second comparator CMP2 becomes a high level, the output from the second latch LTH2 becomes a low level, and thus the driving signal Sd is disabled at a low level. On the other hand, when the count value of the timer 710 constantly increases and reaches into a predetermined time set in the TOPF register 720, namely the switching period, an output from the third comparator CMP3 becomes a high level, and enables the memory access unit 810 as an enable signal through the second OR gate OR2. Accordingly, the memory access unit 810 outputs the second address signal and the read enable signal rd_enable to the memory 820. The switching period set in the TOPF register 720 corresponds to one period of the driving signal Sd. When it is presumed that the switching period is 50 μsec and the value outputted from the shifter 850 is a time corresponding to 30 μsec, the waveform of the driving signal Sd is as shown in FIG. 14. On the other hand, the level of the driving signal Sd can be varied according to a polarity value inputted to the other side input terminal of the exclusive OR gate E_OR. That is to say, the driving signal Sd is low or high enabled according to the polarity value.

As the memory access unit 810 sequentially increases and outputs the address signals one by one, the sine wave voltage values stored in the memory 820 are sequentially outputted. As a result, the driving signal Sd is repeatedly periodically enabled.

On the other hand, the last address register 860 outputs the last address value of the memory 820, namely the the last address value storing the sine wave voltage values to a fourth comparator CMP4. In case the address outputted from the memory access unit 810 is the last address, the fourth comparator CMP4 outputs a high level sign signal. From this point, the memory access unit 810 sequentially decreases and outputs the address signals one by one.

When the address inputted from the memory access unit 810 is 'ooh', an output from a fifth comparator CMP5 becomes a high level. Accordingly, the first latch LTH1 is reset, and the operation of the timer 710 is stopped. It implies that, when the sine wave voltage values stored in the memory 820 are repeatedly outputted, the operation of the PAM driving unit 500 is stopped until a succeeding zero crossing input is inputted, in order to prevent an abnormal operation of the system.

In addition, a sixth comparator CMP6 connected to one side input terminal of the AND gate AND, is provided in order to prevent a noise generated due to abnormality from being mistakenly regarded as the zero crossing input. When the upper four bits of the address inputted to the memory access unit 810 are 'oh', the sixth comparator CMP6 outputs the high level output signal to the AND gate AND.

Figure 15:
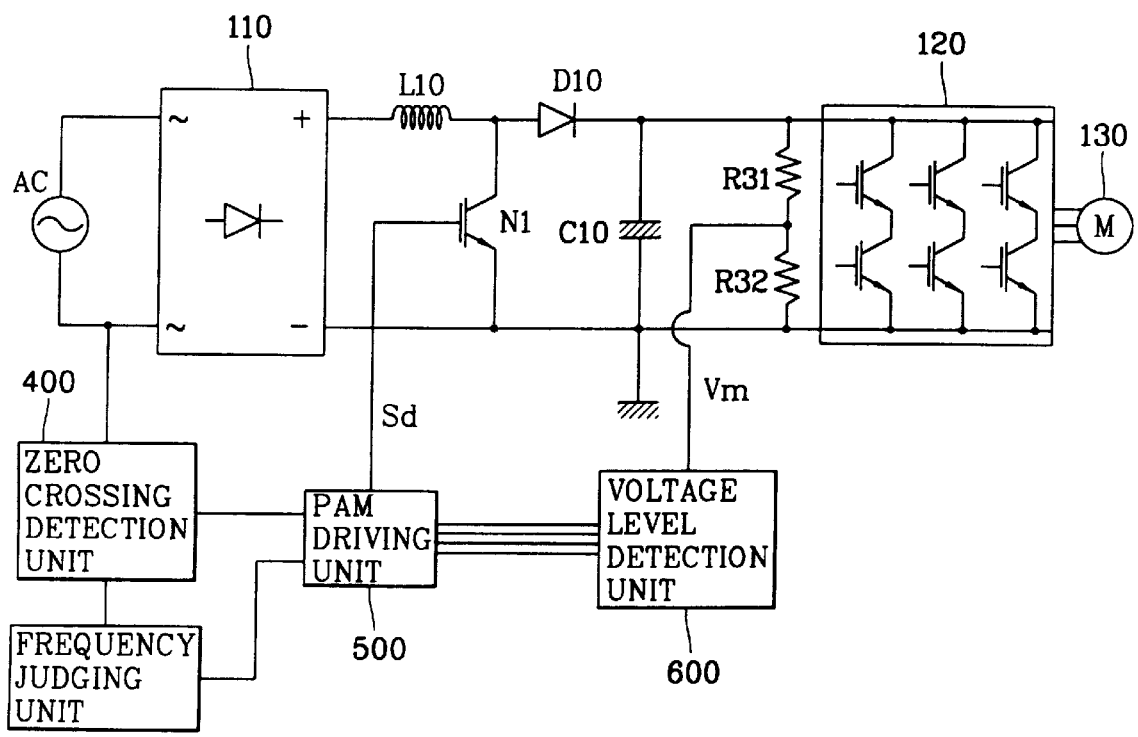
FIG. 15 is a structure diagram illustrating a power factor compensation device for a motor driving inverter system in accordance with a sixth embodiment of the present invention.

A power factor compensation device for a motor driving inverter system in accordance with a sixth embodiment of the present invention will now be described with reference to FIGS. 15 and 16. While the sine wave voltage values are stored in the memory by considering the frequency of the utility alternating current power AC in the first to fifth embodiments of the present invention, the system is operated regardless of the frequency of the utility alternating current power AC in the sixth embodiment thereof. FIG. 15 is a structure diagram illustrating the power factor compensation device for the motor driving inverter system in accordance with the sixth embodiment of the present invention. Here, a frequency judging unit 700 is further included, as compared with the power factor compensation device for the motor driving inverter system according to the second embodiment as shown in FIG. 8. Also, a memory (not shown) of the PAM driving unit 500 stores the sine wave form voltage values by frequencies in the table form as shown in FIG. 16.

On the other hand, when it is presumed that a sampling period of the sine wave voltage values is constant, if the frequency of the utility alternating current power AC is varied, the number of the sine wave voltage values must be varied. For example, when the frequency of the utility alternating current power AC is 60 Hz, if the number of the sine wave voltage values considering the sampling period is 200, when the frequency of the utility alternating current power AC is 50 Hz, the number of the sine wave voltage values is 160.

The frequency judging unit 700 judges the frequency of the utility alternating current power AC inputted from the currently-detected zero crossing point and the previously-detected zero crossing point, and outputs the detection result to the PAM driving unit 500. The PAM driving unit 500 designates the address of the corresponding memory based on the judged frequency, thereby outputting the sine wave voltage values stored in the designated address.

For example, in the case that the frequency judging unit 700 judges that the frequency of the utility alternating current power AC is 60 Hz, the PAM driving unit 500 firstly designates an address 0005, and secondly designates an address is 0011. Conversely, when it is judged that the frequency of the utility alternating current power AC is 50 Hz, the PAM driving unit 500 firstly designates an address 0004, and secondly designates an address 0010.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a motor driving inverter system rectifying/smoothing an alternating current power, and driving a motor by performing pulse width modulation, a power factor compensation device for the motor driving inverter system, comprising:

an inverter connected to the motor;

a microprocessor for detecting zero crossing points of the alternating current power to determine time periods therebetween, and for sequentially outputting a driving signal corresponding to one of a plurality of sine wave form voltage values according to the detected result of a time period and a voltage of the alternating current power, in a state where the plurality of sine wave form voltage values corresponding to the voltage of the alternating current power and frequencies are internally stored; and a switching transistor connected in parallel to the inverter, and switched according to the driving signal, a duty of the driving signal being varied correspondingly to each of the plurality of sine wave form voltage values.

2. In a motor driving inverter system rectifying/smoothing an alternating current power, and driving a motor by performing pulse width modulation, a power factor compensation device for the motor driving inverter system, comprising:

an inverter connected to the motor;

a zero crossing detection unit connected to an alternating current power source for detecting a zero crossing point of the alternating current power to determine intervals therebetween corresponding to a frequency, and outputting a zero crossing input;

a PAM driving unit that receives the zero crossing input for internally storing a plurality of sine wave form voltage values corresponding to the voltage of the alternating current power and the corresponding frequency, and for sequentially outputting a driving signal corresponding to the plurality of sine wave form voltage values; and a switching transistor connected in parallel to the inverter, and switched according to the driving signal.

3. The device according to claim 2, further comprising a voltage level detection unit for detecting the rectified direct current voltage applied to the inverter, and outputting a divided voltage to the PAM driving unit, the PAM driving unit outputting the driving signal in consideration of the level of the divided voltage.

4. The device according to 2, wherein the PAM driving unit comprises:

a pointer generating unit for receiving the zero crossing input, sequentially generating a pointer signal, adding a commercial frequency value of the system into the pointer value, and outputting it;

a memory for internally storing a plurality of sine wave form voltage values corresponding to the voltage of the utility alternating current power and the frequency, and outputting the sine wave form voltage values stored in an address designated according to the pointer;

a three phase buffer for passing or intercepting the sine wave form voltage values according to a disable signal;

an interrupt generating unit for generating an interrupt signal according to the commercial frequency of the system; and a counter for counting an output from the three phase buffer, outputting a signal according to the counted value, and outputting the disable signal to the three phase buffer when receiving the interrupt signal.

5. The device according to claim 4, further comprising:

a factor computing unit for outputting a divided voltage and a factor value reflecting a characteristic factor of the motor, when receiving the divided voltage from the rectified direct current voltage applied to the inverter; and a multiplexer for multiplying the factor value by the sine wave form voltage value outputted from the memory, and outputting it to the three phase buffer.

6. The device according to claim 4, further comprising a logic gate for passing the signal outputted from the counter, when the system reset signal and the zero crossing input are at a low level.

7. The device according to claim 2, wherein the PAM driving unit comprises:

a logic gate for passing the zero crossing input or a next address signal;

a first pointer generating unit for sequentially generating a pointer signal according to an output from the logic gate, adding a commercial frequency of the system into the point signal and outputting it, and outputting a period adjustable signal;

a second pointer generating unit for outputting the next address signal to the logic gate by adding/subtracting an operational frequency of the system according to the period adjustable signal;

a memory for internally storing a plurality of sine wave form voltage values corresponding to the voltage of the utility alternating current power and the frequency, and outputting the sine wave form voltage values stored in an address designated according to the pointer;

a three phase buffer for passing or intercepting the sine wave form voltage values according to a disable signal;

an interrupt generating unit for generating an interrupt signal according to the commercial frequency of the system; and a counter for counting an output from the three phase buffer, outputting a signal according to the counted value, and outputting the disable signal to the three phase buffer when receiving the interrupt signal, the first pointer generating unit increasing/decreasing and outputting a point signal according to the next address signal.

8. The device according to claim 7, further comprising:

a factor computing unit for outputting a divided voltage and a factor value reflecting a characteristic factor of the motor, when receiving the divided voltage from the rectified direct current voltage applied to the inverter; and a multiplexer for multiplying the factor value by the sine wave form voltage value outputted from the memory, and outputting it to the three phase buffer.

9. The device according to claim 7, further comprising a logic gate for passing the signal outputted from the counter, when the system reset signal and the zero crossing input are at a low level.

10. The device according to claim 2, wherein the PAM driving unit comprises:

a logic gate for passing the zero crossing input or a next address signal;

a first pointer generating unit for sequentially generating a pointer signal according to an output from the logic gate, adding a commercial frequency of the system into the point signal and outputting it, and outputting a period adjustable signal;

a second pointer generating unit for outputting the next address signal to the logic gate by adding/subtracting an operational frequency of the system according to the period adjustable signal, and outputting a period variation signal to the first pointer generating unit by judging whether a carry is generated at the next address signal;

a memory for internally storing a plurality of sine wave form voltage values corresponding to the voltage of the utility alternating current power and the frequency, and outputting the sine wave form voltage values stored in an address designated according to the pointer;

a three phase buffer for passing or intercepting the sine wave form voltage values according to a disable signal;

an interrupt generating unit for generating an interrupt signal according to the commercial frequency of the system; and a counter for counting an output from the three phase buffer, outputting a signal according to the counted value, and outputting the disable signal to the three phase buffer when receiving the interrupt signal, the first pointer generating unit increasing/decreasing and outputting a point signal according to the next address signal and the period variation signal.

11. The device according to claim 10, further comprising:

a factor computing unit for outputting a divided voltage and a factor value reflecting a characteristic factor of the motor, when receiving the divided voltage from the rectified direct current voltage applied to the inverter; and a multiplexer for multiplying the factor value by the sine wave form voltage value outputted from the memory, and outputting it to the three phase buffer.

12. The device according to claim 10, further comprising a logic gate for passing the signal outputted from the counter, when the system reset signal and the zero crossing input are at a low level.

13. The device according to claim 2, wherein the PAM driving unit comprises:
   a delay unit for delaying the zero crossing input for a predetermined time and outputting it, when receiving the zero crossing input;
   a switching period count unit for starting a count operation according to the zero crossing input, and outputting a count completion signal, when counting as long as a switching period;
   a memory unit for internally storing a plurality of sine wave form voltage values corresponding to a voltage of the utility alternating current power and frequencies, and enabled according to the delayed zero crossing input or the count completion signal for outputting the sine wave form voltage value; and
   a latch unit enabled according to the zero crossing input, and disabled when a time corresponding to the sine wave form voltage value is identical to a time counted in the switching period count unit, for outputting the driving signal.

14. The device according to claim 13, wherein the delay unit comprises:
   a delay timer for starting the count operation, when receiving the zero crossing input;
   a delay register for having a previously-set error time; and
   a first comparator for outputting the delayed zero crossing input, when the error time lapses.

15. The device according to claim 13, wherein the switching period count unit comprises:
   a first latch set according to the zero crossing input;
   a timer enabled by the first latch, for starting the count operation;
   a TOPF register for storing the time corresponding to the switching period; and
   a third comparator for outputting the count completion signal, when the counted time is identical to the time stored in the TOPF register.

16. The device according to claim 13, wherein the memory unit comprises:
   a memory access unit enabled according to the delayed zero crossing input or the count completion signal, for outputting an address signal and a read enable signal; and
   a memory unit for internally storing the plurality of sine wave form voltage values corresponding to the voltage of the utility alternating current power and frequencies, and read-enabled according to the read enable signal, for outputting the sine wave form voltage stored in an address designated according to the address signal.

17. The device according to claim 13, wherein the latch unit comprises:
   a second comparator for comparing the time corresponding to the sine wave form voltage value with the time counted in the switching period count unit, and outputting a resultant signal; and
   a second latch enabled according to the zero crossing input, and reset according to an output from the second comparator, for outputting the driving signal.

18. The device according to claim 13, further comprising:
   an AMP register for storing a factor value of the motor;
   a multiplexer for multiplying the factor value of the motor by the sine wave form voltage value; and
   a shifter for shifting an output value from the multiplier, and outputting it to the latch unit, the latch unit comparing the time counted in the switching period count unit with the time corresponding to the output value from the shifter.

19. The device according to claim 16, further comprising:
   a last address register for outputting a last address value from the memory; and
   a fourth comparator for outputting a sign signal, when an address inputted from the memory access unit is identical to an address outputted from the last address register; the memory access unit decreasing and outputting the address receiving the sign signal one by one.

20. The device according to claim 16, further comprising a fifth comparator for outputting a signal disabling the latch unit, when the address inputted from the memory access unit is lower than a first address.

21. The device according to claim 16, further comprising:
   a sixth comparator for judging whether the address inputted from the memory access unit is a first address, and outputting a resultant signal; and
   a logic gate for outputting the zero crossing input to the delay unit, when receiving an output from the sixth comparator.

22. The device according to claim 13, wherein a level of the driving signal outputted from the latch unit is varied according to a polarity value.

23. The device according to claim 2, further comprising a frequency judging unit for judging a frequency of the utility alternating current power inputted from a currently-detected zero crossing point and a previously-detected zero crossing point, and outputting the detection result to the PAM driving unit, the PAM driving unit designating the address of the memory based on the judged frequency, and outputting the sine wave voltage values stored in the designated address.

24. The device according to claim 1, wherein the sine wave form voltage values correspond to one of a quarter period, a half period, a prescribed period and a full period of the alternating current power.

25. The device according to claim 2, wherein the sine wave form voltage values have a pattern substantially equal to a sine wave form of an AC power source of the alternating current power at the corresponding frequency set substantially identical to a frequency of the AC power source.

26. In a motor driving inverter system rectifying/smoothing an alternating current power, and driving a motor by performing pulse width modulation, power factor compensation means for the motor driving inverter system, comprising:
   an inverter connected to the motor;
   zero crossing detection means connected to an alternating current power source for detecting a zero crossing point of the alternating current power to determine selected intervals therebetween corresponding to frequencies, and outputting a zero crossing input;
   PAM driving means that receives the zero crossing input for internally storing a plurality of sine wave form voltage values corresponding to the voltage of the alternating current power and the corresponding frequencies, and for sequentially outputting a driving signal corresponding to the plurality of sine wave form voltage values indicated by each selected interval; and
   a switching transistor connected in parallel to the inverter, and switched according to the driving signal.

27. A motor driving inverter system, comprising:
   an AC power source;

rectification means connected to the AC power source for rectifying an output of the AC power source;

smoothing means connected to the rectification means for smoothing an output of the rectification means;

a motor;

an inverter connected to the motor receiving an output of the smoothing means;

zero crossing means connected to the system for detecting zero crossings of the output of the AC power source;

storing means for storing a plurality of sine wave form voltage values corresponding to a plurality of voltages, which include a voltage of the AC power source, at prescribed frequencies, wherein one of the prescribed frequencies is substantially identical to a frequency of the AC power source;

detecting means for detecting the voltage of the AC power source;

controller means connected to the storing means, the detecting means and the zero crossing means that uses at least two zero crossing points from the zero crossing means for determining an interval and for outputting a driving signal corresponding to a selected one of the plurality of sine wave form voltage values according to the detected result of the interval and the voltage of the AC power source; and a switching transistor driving means connected to the controller means and connected in parallel to the inverter for driving the inverter according to the driving signal.

28. The device according to claim 27, wherein the sine wave form voltage values have a pattern substantially equal to a sine wave form of the AC power source at the frequency of the AC power source, and wherein the sine wave form voltage values correspond to one of a quarter period, a half period, a prescribed period and a full period of the sine wave form of the AC power source.

29. In a motor driving inverter system rectifying/ smoothing an alternating current power, and driving a motor by performing pulse width modulation, a power factor compensation device for the motor driving inverter system, comprising:

an inverter connected to the motor;

a zero crossing detection unit for detecting a zero crossing point of the alternating current power, and outputting a zero crossing input;

a PAM driving unit for internally storing a plurality of sine wave form voltage values corresponding to the voltage of the alternating current power and the frequency, and for sequentially outputting a driving signal corresponding to the plurality of sine wave form voltage values;

a switching transistor connected in parallel to the inverter, and switched according to the driving signal; and a frequency judging unit for judging a frequency of the alternating current power inputted from a currently-detected zero-crossing point and a previously-detected zero-crossing point, and outputting the detection result to the PAM driving unit, the PAM driving unit designating the address of the memory based on the judged frequency, and outputting the sine wave voltage values stored in the designated address.

* * * * *